(12) United States Patent
Uematsu et al.

(10) Patent No.: US 8,827,435 B2
(45) Date of Patent: Sep. 9, 2014

(54) CONDUCTOR PATTERN PRINTING INK

(75) Inventors: Daisuke Uematsu, Aichi-gun (JP);
Kentaro Mori, Inuyama (JP); Nobuhiro Hayakawa, Chita (JP)

(73) Assignee: NGK Spark Plug Co., Ltd., Aichi (JP)

( * ) Notice: Subject to any disclaimer, the term of this patent is extended or adjusted under 35 U.S.C. 154(b) by 183 days.

(21) Appl. No.: 13/325,658

(22) Filed: Dec. 14, 2011

(65) Prior Publication Data
US 2012/0154494 A1    Jun. 21, 2012

(30) Foreign Application Priority Data

Dec. 15, 2010 (JP) ................................. 2010-279802
Oct. 11, 2011 (JP) ................................. 2011-224259

(51) Int. Cl.
*C09D 11/00* (2014.01)
*C09D 7/12* (2006.01)

(52) U.S. Cl.
CPC ............ *C09D 11/322* (2013.01); *C09D 7/1275* (2013.01); *C09D 11/52* (2013.01); *C09D 7/1266* (2013.01)
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 5,009,708 A | | 4/1991 | Grünwald et al. |
| 7,183,342 B2* | | 2/2007 | Miyamoto et al. ............ 524/161 |
| 2001/0001406 A1* | | 5/2001 | Liberatore et al. ......... 156/89.12 |
| 2003/0230484 A1* | | 12/2003 | Jain et al. ....................... 204/424 |
| 2004/0151893 A1* | | 8/2004 | Kydd et al. ..................... 428/323 |
| 2007/0095662 A1 | | 5/2007 | Suzuki |
| 2008/0282537 A1 | | 11/2008 | Lee et al. |
| 2009/0293766 A1* | | 12/2009 | Kamikoriyama et al. . 106/31.92 |
| 2012/0126183 A1 | | 5/2012 | Hosoi et al. |

FOREIGN PATENT DOCUMENTS

| | | | | |
|---|---|---|---|---|
| JP | S58-89669 | A | 5/1983 | |
| JP | 8-148369 | A | 6/1996 | |
| JP | 2004031362 | A * | 1/2004 | ............ H05B 33/22 |
| JP | 2006-104511 | A | 4/2006 | |
| JP | 2006-173042 | A | 6/2006 | |
| JP | 2006-193796 | A | 7/2006 | |
| JP | 2006-299385 | A | 11/2006 | |
| JP | 2006-335995 | A | 12/2006 | |
| JP | 2007-121173 | A | 5/2007 | |
| JP | 2008-283181 | A | 11/2008 | |
| JP | 2009-170447 | A | 7/2009 | |
| JP | 2009-227825 | A | 10/2009 | |
| JP | 2012-022799 | A | 2/2012 | |
| JP | 5140187 | B1 | 2/2013 | |

OTHER PUBLICATIONS

English Translation of Notification of Reasons for Rejection dated Jul. 30, 2013 in Japanese Patent Application No. 2011-224259.

* cited by examiner

*Primary Examiner* — Laura Martin
(74) *Attorney, Agent, or Firm* — Sughrue Mion, PLLC

(57) ABSTRACT

There is provided an ink for printing a conductor pattern on a substrate, including platinum particles, wherein 70% or more of the platinum particles have a particle size of 0.05 to 0.5 μm. Even when the viscosity of the printing ink is controlled to a relatively low level for use in ink-jet printing process, it is possible by such particle size distribution control to prevent sedimentation of the platinum particles and excessive shrinkage of the conductor pattern due to sintering of the platinum particles during firing so that the conductor pattern can attain improved conduction characteristics.

8 Claims, 4 Drawing Sheets

Pt ONLY

AFTER FIRING AT 1525°C

Pt + ZrO2

AFTER FIRING AT 1525°C

AFTER FIRING AT 1525°C

AFTER FIRING AT 800°C

CONDUCTOR PATTERN PRINTING INK

BACKGROUND OF THE INVENTION

The present invention relates to an ink for printing a conductor pattern.

Various conductor pattern printing techniques using printing inks containing metal particles such as nanoparticles of gold, silver, copper, platinum etc. have been proposed. For example, Japanese Laid-Open Patent Publication No. 2008-283181 discloses one such a conductor pattern printing technique in which a wiring pattern is formed on a circuit board by printing a metal particle-containing ink on a base film and induction heating the ink-printed base film. Further, Japanese Laid-Open Patent Publication No. 2007-121173 discloses a printing technique in which a platinum particle-containing ink is printed by ink-jet printing process on a solid electrolyte substrate to form an intermediate electrode layer of a gas sensor element.

SUMMARY OF THE INVENTION

In the case of forming a conductor pattern by ink-jet printing process with the use of a printing ink containing metal particles as disclosed in Japanese Laid-Open Patent Publication No. 2007-121173, it is necessary to control the viscosity of the printing ink to a relatively low level so that the printing ink can be discharged favorably from an ink-jet head (ink-jet nozzles). However, there occurs sedimentation of the metal particles occurs in the printing ink when the viscosity of the printing ink is low. This results in a deterioration of the conduction characteristics of the conductor pattern due to biased dispersion of the metal particles in the printing ink. It is conceivable to decrease the particle size of the metal particles and thereby reduce the weight of the metal particles for the purpose of improving the dispersibility of the metal particles in the printing ink. When the particle size of the metal particles is decreased, however, the conductor pattern undergoes excessive shrinkage during firing and becomes cracked due to excessive sintering of the metal particles. This also results in a deterioration of the conduction characteristics of the conductor pattern and, in some cases, leads to a breakage of the conductor pattern.

It is therefore an object of the present invention to provide an ink for printing a conductor pattern without causing a deterioration of the conduction characteristics of the conductor pattern and a breakage of the conductor pattern.

According to an aspect of the present invention, there is provided an ink for printing a conductor pattern, comprising: platinum particles, wherein 70% or more of the platinum particles have a particle size of 0.05 to 0.5 μm.

The other objects and features of the present invention will also become understood from the following description.

DESCRIPTION OF THE EMBODIMENTS

The present invention will be described in detail below.

A conductor pattern printing ink according to one embodiment of the present invention (hereinafter just referred to as "printing ink") is designed for use to print a conductor pattern by ink-jet printing process on a substrate. As the substrate, there can be used a ceramic substrate or the like to be fired at a high temperature of 1100° C. or higher.

Figure 1:
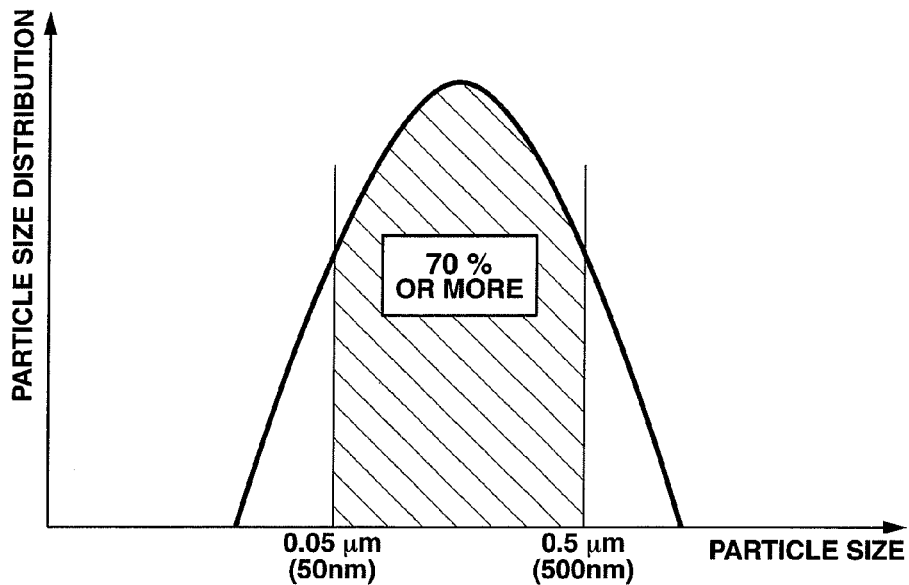
FIG. 1 is a schematic view showing the particle size distribution of platinum particles in a conductor pattern printing ink according to one embodiment of the present invention.
Figure 2:
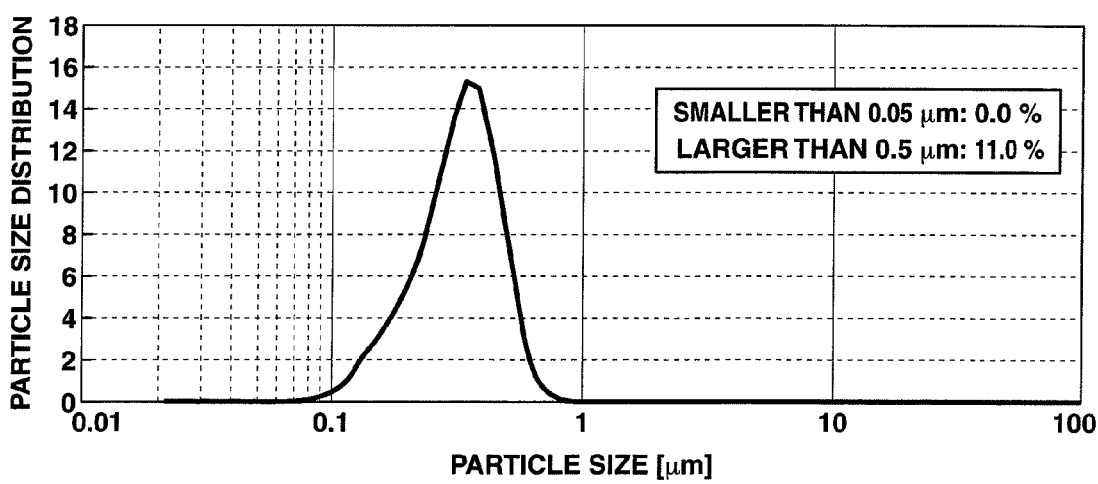
FIG. 2 is a detailed schematic view showing the measurement results of the platinum particle size distribution of the conductor pattern printing ink according to the one embodiment of the present invention.

In the present embodiment, the printing ink is prepared from platinum (Pt) particles, a binder, a dispersant, a solvent etc. and characterized in that 70% or more of the platinum particles have a particle size of 0.05 to 0.5 μm as shown in FIG. 1. By way of example, the proportion of the platinum particles having a particle size of smaller than 0.05 μm is set to 0.0%; and the proportion of the platinum particles having a particle size of larger than 0.5 μm is set to 11.0% as shown in FIG. 2 in the present embodiment.

If the proportion of the platinum particles exceeding 0.5 μm in size is too high, it is difficult to disperse the platinum particles in the solvent due to sedimentation of the platinum particles. On the other hand, the platinum particles undergo excessive sintering during high-temperature firing to thereby cause cracking or breakage of the printed conductor pattern if the proportion of the platinum particles smaller in size than 0.05 μm is too high.

When the particle size distribution of the platinum particles is controlled to within the above-specified range, it is possible to prevent the platinum particles from being sedimented in the printing ink and being sintered excessively during the firing. The printing ink can be thus suitably used in ink-jet printing process. Even when the viscosity of the printing ink is controlled to a relatively low level for use in ink-jet printing process, the conductor pattern can be printed with the printing ink so as not to cause a deterioration of the conduction characteristics of the conductor pattern and a breakage of the conductor pattern.

This printing ink is particularly suitable for use in the case where the printed conductor pattern and the substrate are simultaneously subjected to high-temperature firing. In the case where the conductor pattern is fired or dried under low temperature conditions, it is unlikely that the conductor pattern will be cracked or broken due to sintering of the platinum particles even if the platinum particles are small in size. In the case where the conductor pattern is fired simultaneously with the substrate under high temperature conditions, it is likely that the conductor pattern will be cracked or broken due to excessive sintering of the platinum particles when the proportion of the platinum particles smaller in size than 0.05 μm becomes high. The above-mentioned particle size distribution control makes it, however, possible to prevent the platinum particles from excessive sintering even during such high-temperature firing and to secure the effective dispersion of the platinum particles as well as the relatively low viscosity of the printing ink suitable for use in ink-jet printing process.

Preferably, the width of the particle size distribution of the platinum particles is as small as possible. It is particularly preferable that the particle size of all of the platinum particles contained in the printing ink is in the range of 0.1 to 0.4 μm.

Further, the printing ink preferably contains either a zirconia oxide or aluminum oxide (alumina), or the same material as a base material of the substrate. The addition of such a zirconia oxide, aluminum oxide or base material is effective in preventing agglomeration of the platinum particles during the firing and in controlling the shrinkage ratio of the conductor pattern during the firing so as to bring the shrinkage ratio of the conductor pattern closer to that of the substrate. The particle size distribution of the zirconia oxide, aluminum oxide or base material is preferably similar to that of the platinum particles.

For example, the printing ink can be prepared from the platinum particles, the zirconia oxide, aluminum oxide or the same material as the base material of the substrate, the solvent, the binder and the dispersant so as to contain 28 mass % of the platinum particles, 4 mass % of the zirconia oxide, aluminum oxide or the same material as the base material of the substrate, 66 mass % of the solvent, 1 mass % of the binder and 1 mass % of the dispersant. (In this case, the mass of the zirconia oxide, aluminum oxide or the same material as the base material of the substrate is 14% assuming the total mass of the platinum particles as 100%.)

It is also preferable that the solvent of the printing ink has a boiling point of 200° C. or higher on the assumption that the substrate printed with the printing ink is fired at a high temperature of 1100° C. or higher. One such a preferred example of the solvent is butyl carbitol acetate. In view of the above composition ratio of the printing ink and in view of the fact that the solvent disappears by evaporation during the high-temperature firing, it can be said that the printing ink (conductor pattern) is platinum-based.

Furthermore, it is preferable to prepare the printing ink in such a manner that the printing ink has a viscosity of 20 mPa·s or lower when the temperature of the printing ink is 70° C. In the case of using the printing ink in ink-jet printing process, it is necessary to control the viscosity of the printing ink to a relatively low level so that the printing ink can be discharged favorably from a print head (nozzles). In general, the print head has the function of heating the printing ink within the range from room temperature (25° C.) to e.g. 70° C. The viscosity of the printing is thus controlled to 20 mPa·s or lower at 70° C., i.e., at the upper limit of the ink heating temperature of the print head. It is feasible to control the viscosity of the printing ink as appropriate by adjusting the amount of the binder, changing the kind of the binder and/or the kind of the solvent etc.

As mentioned above, the printing ink can suitably be used to print the conductor pattern by ink-jet printing on the substrate. The thus-obtained conductor pattern has a multitude of uses.

Figure 3:
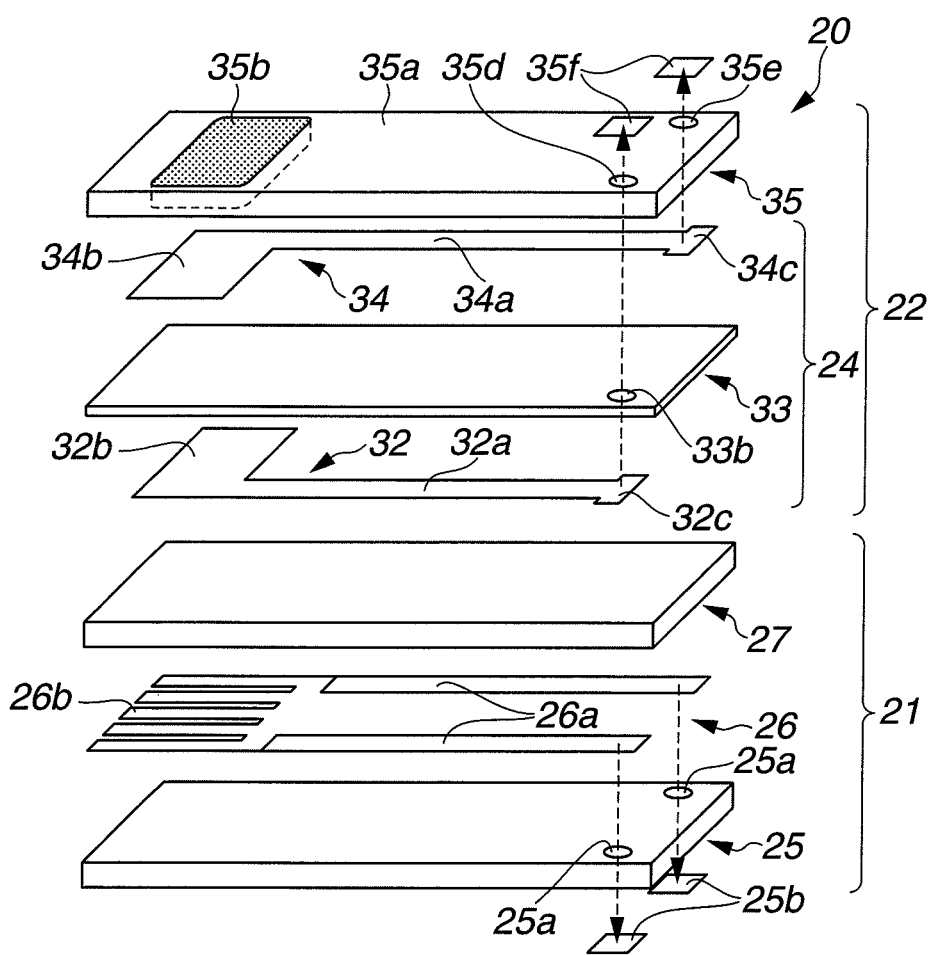
FIG. 3 is an exploded perspective view of a sensor element in which a conductor pattern is printed with the conductor pattern printing ink according to the one embodiment of the present invention.

For example, the conductor pattern is applicable to a gas sensor element 20 as shown in FIG. 3. The gas sensor element 20 has a sensor body 22 and a heater 21 laminated together.

The heater 21 includes a pair of first and second rectangular substrate members 27 and 25 and a heating resistor 26.

The first and second rectangular substrate members 27 and 25 are formed predominantly of a sintered ceramic material such as aluminum oxide (alumina).

The heating resistor 26 is formed predominantly of platinum etc. and is arranged between the first and second substrate members 27 and 25. As shown in FIG. 3, the heating resistor 26 has a winding-shaped heating portion 26b capable of generating heat upon energization thereof and a pair of heater lead portions 26a connected at respective one ends thereof to the heating portion 26b and extending along a longitudinal direction of the substrate member 25, 27.

A pair of heater energization terminals 25b are arranged on the second substrate member 25 and connected to external terminals for connection to an external circuit. Further, two through holes 25a are formed in the second substrate member 25 for connection of the other ends of the heater lead portions 26a to the heater energization elements 25b, respectively.

On the other hand, the sensor body 22 includes an oxygen concentration detection cell (cell layer) 24 and a protection layer 35.

The oxygen concentration detection cell 24 has a rectangular solid electrolyte substrate 33 and first and second electrode patterns 32 and 34.

The solid electrolyte substrate 33 is formed of a solid electrolyte material for an oxygen concentration cell. Examples of such a solid electrolyte material are sintered zirconia ($ZrO_2$) and sintered $LaGaO_3$ each containing yttria ($Y_2O_3$) or calcia (CaO) as a stabilizer.

The first and second electrode patterns 32 and 34 are formed by ink-jet printing of the above-mentioned printing ink on opposite main surfaces of the solid electrolyte substrate 33, and then, fired simultaneously with the solid electrolyte substrate 33 at a high temperature e.g. exceeding 1100° C.

As shown in FIG. 3, the first and second electrode patterns 32 and 34 have first and second electrode pad portions 32b and 34b and first and second electrode lead portions 32a and 34a, respectively. The first and second electrode pad portions 32b and 34b face each other via the solid electrolyte substrate 33 and thereby constitute a sensing section in combination with the solid electrolyte substrate 33. The first lead portion 32a extends from the first electrode pad portion 32b in the longitudinal direction of the solid electrolyte substrate 33, whereas the second electrode lead portion 34a extends from the second electrode pad portion 34b in the longitudinal direction of the solid electrolyte substrate 33.

The protection layer 35 is laminated on a surface of the second electrode pattern 34 opposite to the solid electrolyte substrate so as to sandwich the second electrode pattern 34 between the solid electrolyte substrate 33 and the protection layer 35. As shown in FIG. 3, the protection layer 35 has a porous electrode protection layer 35b for protecting the second electrode pad portion 34b from poisoning and a reinforcement protection layer 35a for protecting the solid electrolyte substrate 33 in the present embodiment. Through holes 35d and 35e are formed in the protection layer 35.

Signal output terminals 35f are provided on the protection layer 35. One of the signal output terminals 35f is connected to the first conductor portion 32c of the first electrode pattern 32 via the through hole 33b of the solid electrolyte substrate 33 and the through hole 35d of the protection layer 35. The other of the signal output terminals 35f is connected to the second conductor portion 34c of the second electrode pattern 34 via the through hole 35e of the protection layer 35.

The above-configured gas sensor element 20 is suitably used in e.g. an air-fuel ratio sensor to detect the concentration of oxygen by the concentration cell action of the oxygen concentration detection cell 24.

As mentioned above, the particle size of the platinum particles in the printing ink is controlled in such a manner that 70% or more of the platinum particles have a particle size of 0.05 to 0.5 μm in the present embodiment. The platinum particles can be thus prevented from excessive sintering during firing at a high temperature e.g. exceeding 1100° C. Further, the printing ink can be controlled to a sufficiently low viscosity for use in ink-jet printing process and, at the same time, can prevent sedimentation of the platinum particles and provide improved dispersibility of the platinum particles. It is thus possible, even when the electrode pattern 32, 34 is formed by ink-jet printing of such a printing ink and sintered simultaneously with the substrate 33 under high temperature conditions, to protect the electrode pattern 32, 34 from excessive shrinkage (cracking, breakage etc.) and prevent a deterioration of the conduction characteristics of the electrode pattern 32, 34 and a breakage of the electrode pattern 32, 34 and improve the connection reliability of the gas sensor element 20.

EXAMPLES

The present invention will be described in more detail below by way of the following examples.

In each of Examples 1 and 2 and Comparative Examples 1 and 2, a printing ink was prepared by mixing platinum particles with a binder, a dispersant, butyl carbitol acetate as a solvent and optionally zirconia. Herein, the particle size distribution of the platinum particles was measured under the following conditions.

[Measurement Conditions]
Equipment: laser diffraction particle size analyzer "LA-750 (mode 700)" manufactured by Horiba Ltd.
Dispersion medium: butyl carbitol acetate
Dispersion method: 3 minutes by external homogenizer and 2 minutes by built-in ultrasonic disperser
Refractive index: none In Examples 1 and 2, the proportion of the platinum particles having a particle size of 0.05 to 0.5 μm in the printing ink was 70% or more as shown in FIGS. 1 and 2. On the other hand, the average particle size of the platinum particles was of the order of 3 nm in Comparative Example 1 and was of the order of 30 nm in Comparative Example 2, that is, the proportion of the platinum particles having a particle size of 0.05 to 0.5 μm in the printing ink was less than 70% in both of Comparative Examples 1 and 2.

A conductor pattern was printed with the prepared printing ink by ink-jet printing process on a substrate, and then, fired simultaneously with the substrate.

The composition of the printing ink and the firing temperature of the conductor pattern are indicated in TABLE. As is seen in TABLE, the amounts of the platinum particles, the dispersant and the binder in the printing ink were about 30 mass %, 1 mass % and 1 mass %, respectively, based on the total mass of the printing ink; and the amount of the zirconia relative to the amount of the platinum particles in the printing ink was 14%.

TABLE

| | Ink components (weight) | | | | | Firing temperature |
|---|---|---|---|---|---|---|
| | Platinum | Zirconia | Solvent | Dispersant | Binder | |
| Example 1 | 6 g | — | 14 g | 0.2 g | 0.2 g | 1525° C. |
| Example 2 | 6 g | 0.84 g | 14 g | 0.2 g | 0.2 g | 1525° C. |
| Comparative Example 1 | 6 g | 0.84 g | 14 g | 0.2 g | 0.2 g | 1525° C. |
| Comparative Example 2 | 6 g | 0.84 g | 14 g | 0.2 g | 0.2 g | 800° C. |

Solvent: butyl carbitol acetate
Ink viscosity: 5.7 mPa · s as measured at 40° C.

Figure 4:
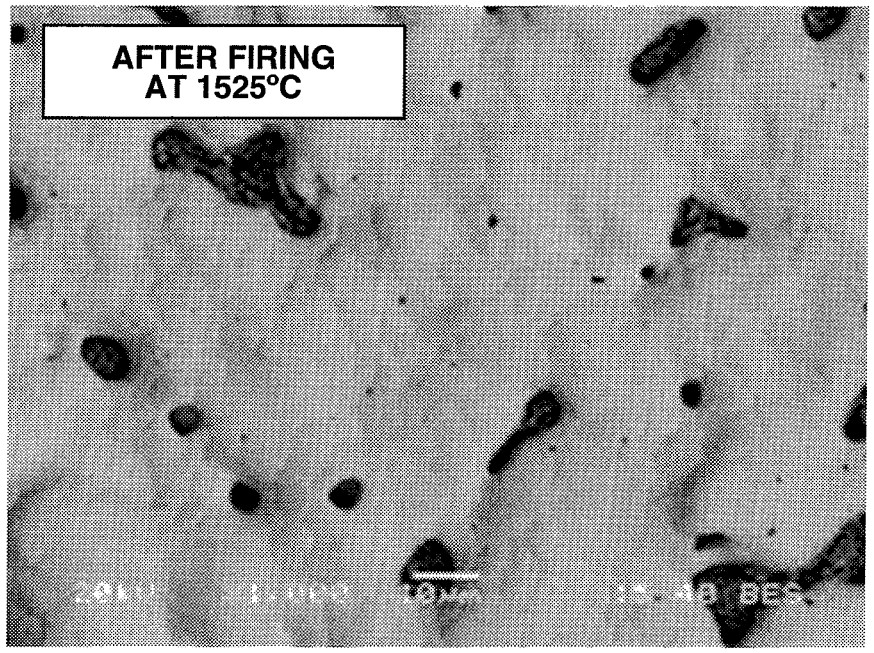
FIG. 4 is an electron micrograph of a conductor pattern of Example 1.
Figure 5:
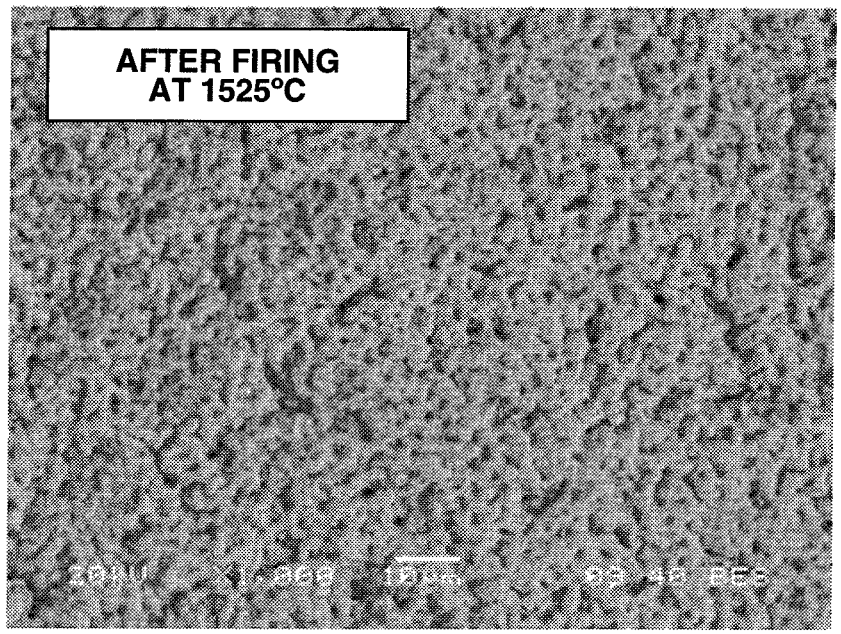
FIG. 5 is an electron micrograph of a conductor pattern of Example 2.
Figure 6:
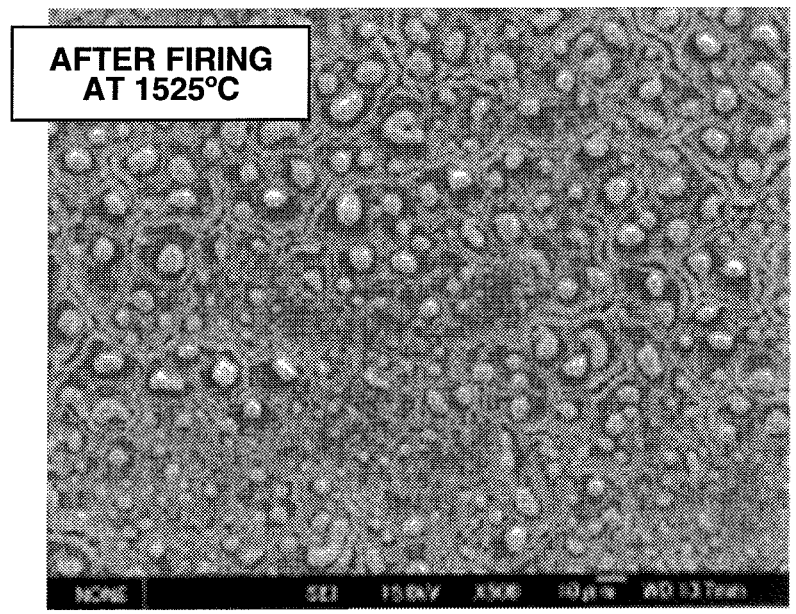
FIG. 6 is an electron micrograph of a conductor pattern of Comparative Example 1.
Figure 7:
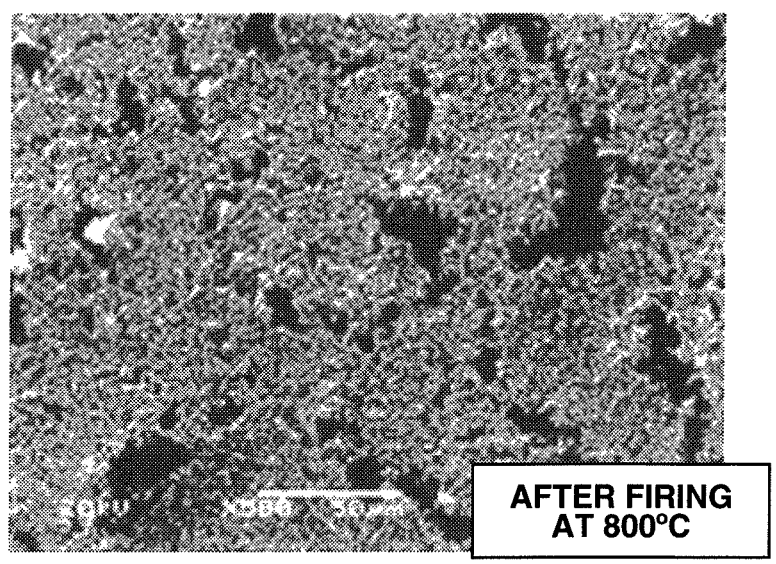
FIG. 7 is an electron micrograph of a conductor pattern of Comparative Example 2.

The thus-obtained conductor pattern was observed with an electron microscope. The observation results are shown in FIGS. 4 to 7, respectively. In Comparative Example 1, the platinum particles were loosely packed in the conductor pattern as shown in FIG. 6. In Comparative Example 2, cracks occurred in a surface of the conductor pattern due to excessive sintering of the platinum particles as shown in FIG. 7. Thus, there was fear of a deterioration of the conduction characteristics of the conductor pattern or a breakage of the conductor pattern in Comparative Examples 1 and 2. In Example 1, the platinum particles were closely packed in the conductor pattern as shown in FIG. 4. Further, no cracks occurred in a surface of the conductor pattern in Example 2 as shown in FIG. 5. It was confirmed that each of the conductor patterns of Examples 1 and 2 secured good electrical conduction characteristics even after the firing.

As described above, it is possible according to the present invention to form the conductor pattern of the printing ink without causing a deterioration of the conduction characteristics of the conductor pattern or a breakage of the conductor pattern.

The entire contents of Japanese Patent Application No. 2010-279802 (filed on Dec. 15, 2010) and No. 2011-224259 (filed on Oct. 11, 2011) are herein incorporated by reference.

Although the present invention has been described with reference to the above specific embodiment of the invention, the present invention is not limited to this exemplary embodiment. Various modification and variation of the embodiment described above will occur to those skilled in the art in light of the above teachings.

The printing ink may contain, in place of the platinum particles, particles of any other noble metal etc. having a melting point equivalent to that of platinum although the platinum particles are contained in the printing ink in the above embodiment.

Further, the use of the printing ink is not limited to conductor pattern printing for use in gas sensors. The printing ink can suitably used to print conductor patterns for not only other sensors but also various equipment parts.

The scope of the invention is defined with reference to the following claims.

What is claimed is:

1. An ink for printing a conductor pattern on a substrate, comprising platinum particles, wherein 70% or more of the platinum particles have a particle size of 0.1 to 0.4 μm.

2. The ink according to claim 1, further comprising either a zirconia oxide or aluminum oxide.

3. The ink according to claim 1, further comprising the same material as a base material of the substrate.

4. The ink according to claim 1, further comprising a solvent having a boiling point of 200° C. or higher.

5. The ink according to claim 1, wherein the ink has a viscosity of 20 mPa·s or lower as measured at 70° C.

6. The ink according to claim 1, wherein the ink is for use in ink-jet printing process.

7. The ink according to claim 1, wherein the printed conductor patter of the ink is fired simultaneously with the substrate at a temperature of 1100° C. or higher.

8. The ink according to claim 1, wherein the particle size of all of the platinum particles is in the range of 0.1 to 0.4 μm.

* * * * *